May 8, 1945.  F. BURDICK  2,375,519
SPOOL CAP LOCK
Original Filed May 31, 1941
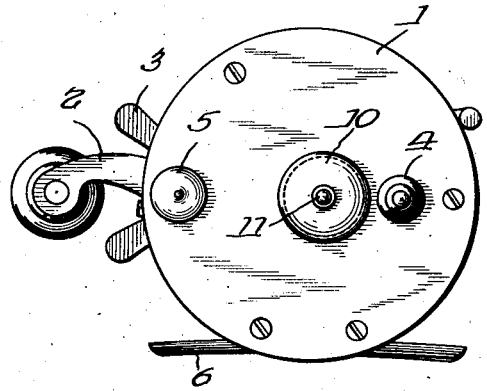
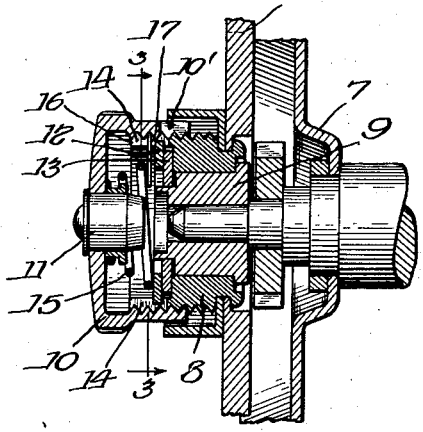
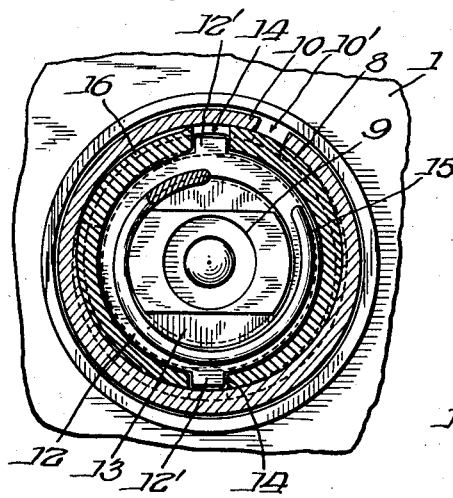
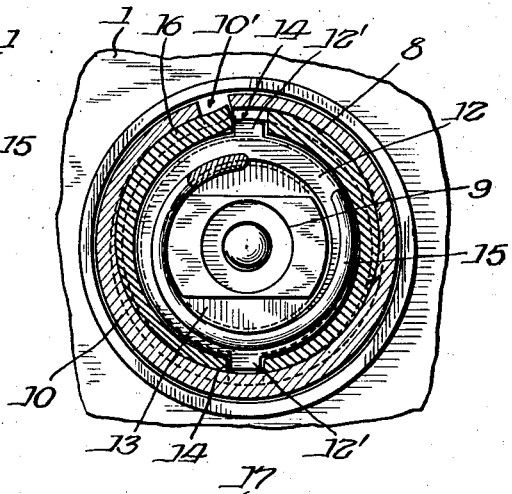
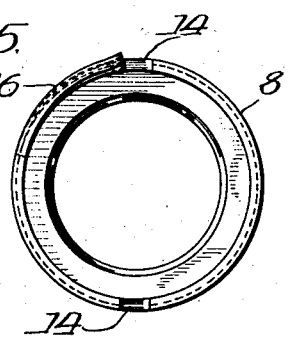
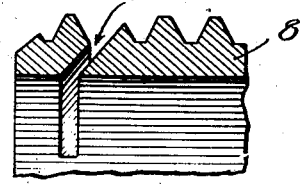
Inventor:
Frank Burdick
By Patented May 8, 1945

2,375,519

UNITED STATES PATENT OFFICE 2,375,519

SPOOL CAP LOCK

Frank Burdick, Kalamazoo, Mich., assignor to Shakespeare Company, Kalamazoo, Mich., a corporation of Michigan Original application May 31, 1941, Serial No. 396,059. Divided and this application December 6, 1943, Serial No. 513,151

7 Claims. (Cl. 151—9)

This invention relates to improvements in locking or securing devices for the spool caps of fishing reels and is a division of my co-pending application for United States Letters Patent, Serial No. 396,059, filed May 31, 1941; having for an object, to provide a device of the stated character, which, while allowing an ample range of adjustment of an equipped cap upon its particular bushing, will, at a predetermined time, automatically operate to positively prevent its accidental or undesired disengagement therefrom, hence avoiding its loss as well as that annoyance and inconvenience caused a user, merely by its unwanted or untimely disengagement from the bushing.

It is also an object of the invention to provide a spool cap locking device of such construction as will render its application or adaptation to an industry recognized standard design of cap and bushing assembly, advantageously economical and practical.

An equally important object of the invention resides in the manner of housing the locking device, and its mode of arrangement and operation in relation to the usual friction drag means provided the assembly, the same being such, that neither interferes with the efficient operation of the other and, moreover, permits of convenient access to parts for purposes of inspection, adjustment, repairs, or the like.

Another important and most advantageous feature of the invention resides in the provision of a locking device of the above identified type, which is wholly received and operative within the spool bushing and cap assembly, thus assuring its constant protection and its continuous efficient operation without interference with or from foreign or external objects, bodies, etc.

The foregoing, as well as other objects, advantages, and meritorious teachings of the invention, will be in part obvious and in part pointed out in the following detailed disclosure thereof, when taken in conjunction with the accompanying drawing, it being understood that the particular form of the invention presented herein is a precise and, what is now considered to be, the best mode of embodying its principles, but that modifications and changes may be made in specific embodiments, without departing from its essential features.

In the drawing:

Figure 1 is a side elevation of a standard type of fishing reel, equipped with the invention.

Figure 2 is an enlarged fragmentary vertical longitudinal section through the spool cap and bushing assembly and an adjacent portion of the reel.

Figure 3 is an enlarged transverse section, taken on the line 3—3 of Figure 2, looking in the direction in which the arrows point, and wherein, the cap locking device is shown in an inoperative position with respect to the spool cap.

Figure 4 is a view corresponding to Figure 3, except that the cap locking device is shown in an operative or locking position with respect to the spool cap.

Figure 5 is an enlarged end elevation of the bushing, showing the arrangement of the cap locking device and also, the arrangement of such device—in dotted lines—when depressed, and, Figure 6 is an enlarged fragmentary longitudinal section through a portion of the drag assembly bushing, showing the manner in which it is slotted to provide the spool cap engaging and locking device.

Having more particular reference to the drawing, in connection with which like characters of reference will designate corresponding parts throughout, it will be noted that the improved cap locking device is herein shown to be applied to a heavy duty type of fishing reel. However, this particular adaptation of the invention is merely illustrative. The locking device may be provided to or adapted upon any design or type of fishing reel wherein a frictional drag means is supplied the reel spool. Moreover, it is to be understood that the invention may be used or applied, generally, to the caps or like elements of reel bushings. In the illustrated embodiment of the invention, the reel tail plate is indicated by the numeral 1; the reel crank, by the numeral 2; the reel gear drag star, by the numeral 3; the reel click button, by the numeral 4; the line carriage tail bushing, by the numeral 5; and the cross plate, whereby the reel may be connected to a pole or rod, by the numeral 6.

As above explained, the herein shown reel is equipped with a spool frictional drag assembly to control or regulate the drag applied to the reel spool during its rotation, the spool being partially illustrated in Figure 2 and designated by the numeral 7. Such assembly includes the usual externally screw-threaded spool bushing 8, rotatably receiving a spool pivot 9 carried on one of the pintles of the reel spool. The bushing 8 is provided with an internally screw-threaded cap 10, having a marginally opening recess or pocket 10' formed in the side thereof, as shown in Figure 2. If desired, a suitably positioned oil cup 11 may be supplied the cap. Relatively engaged juxtaposed friction washers 12 and 13 are received in the bushing 8, and, as will be noted, the latter is engaged with the outer end of the spool pivot 9, and the former, with the bushing 8 through diametrically opposed outwardly extending fingers 12' thereon; said fingers engaging in outwardly opening slots or ways 14 formed in diametrically opposed portions of the bushing 8. A helical spring 15 is engaged in the outer end of the cap 10, as shown in Figure 2 of the accompanying drawing, and has its free inner end bearing upon the outer side of the friction washer 12. Thus, a predetermined degree of frictional engagement or drag between the friction washers 12 and 13 may be effected by turning adjustment of the cap 10 with respect to the externally screw-threaded portion of the bushing 8.

As will be readily understood by persons skilled in this particular art, to increase or decrease the application of frictional drag to the spool assembly, the cap 10 is adapted to be rotated either clockwise or counter-clockwise. In an instance where said cap is rotated counter-clockwise, the frictional drag of the assembly will be correspondingly and progressively decreased. And, it will be moreover understood that heretofore, as a spool cap, such as the cap 10, was rotated or turned in a counter-clockwise manner, the fisherman or user has been required to exercise considerable care or caution, lest he thereby cause said cap to be completely disengaged from its bushing and permit displacement or loss of vital operating parts of the assembly. With a view toward eliminating such objectionable and most annoying incidents, I provide the assembly bushing 8 with an integral pawl-like locking device or catch 16. In forming such locking device or catch 16, an acutely angular saw-cut 17 is made transversely of a portion of the bushing 8, preferably in proximity and substantially parallel to the normally outer end or margin portion thereof. As shown in the Figure 2, this acutely angular saw-cut 17 opens onto a side of one of the longitudinal slots or ways 14 in the bushing 8. Thus, an integral spring locking device is provided the bushing 8. At this point, it is to be noted that the locking device or catch 16, is sprung outwardly from the body of said bushing 8 and has its free end outwardly or radially disposed by bending, or like expedient. Because of the normal outward disposition or positioning of the catch 16 with respect to the adjacent portion of the periphery of the bushing 8, plus the inherent spring quality of said catch, it will be seen that when the spool cap 10 is turned onto the screw-threaded bushing 8, in either clockwise or counter-clockwise direction, said cap will be brought to the particularly desired position for adjusting the frictional drag elements of the assembly to either brake rotation or permit of freer rotation of the reel spool. Should the cap 10 be rotated in a counter-clockwise direction, and particularly, to a point where its marginally opening recess or way 10' registers with the normally outwardly thrust free end of the integral catch 16, such free end will instantly engage in the recess 10', as illustrated in Figure 4 of the accompanying drawing. When so engaged, it is obvious that the catch will lock or prevent any and all further continued counter-clockwise rotation of the cap 10. In consequence, undesirable or accidental disengagement of said cap from its bushing 8, will be prevented. If desired, however, the catch 16 may be depressed with respect to the cap 10 and thereby, have its free end disengaged or removed from the cap recess 10'; allowing such cap to be then turned counter-clockwise for disengagement from the bushing 8. The normal position and formation of the free end of the integral catch or locking device 16 is such that the cap 10 may be turned clockwise into screw-threaded engagement with its bushing 8, and, during such turning, will ride freely over and by said free end of the catch. Obviously, by such unimpeded clockwise turning of the cap 10, the drag produced or effected by the extent of engagement between the friction washers 12 and 13 may be readily adjusted or modulated to the required degree.

I desire to have it understood that the saw-cut or slot 17 formed in the bushing 8, whereby to provide or constitute an integral spring catch 16, is preferably milled at such an angle that when said catch is inwardly thrust or depressed to unlock or free the cap 10 for rotation, said catch can only be depressed or inwardly moved a limited distance, i. e., it can only be flexed inwardly enough to effect such desired unlocking movement, and that, without destroying its spring locking efficiency, due to excessive inward flexing or thrusting beyond the inner periphery of the bushing 8. Naturally, the degree at which the saw-cut or slot 20 is formed or milled, may be varied. Nevertheless, the particular angle of such milling or cutting of the slot should be such, that there will be sufficient relative over-lapping arrangement or engagement between the juxtaposed sides fo the integral catch 16 and its bushing 8.

I claim:

1. A cap lock, including a bushing, a radially outwardly movable lock spring integral with a portion of the wall of said bushing, and a cap rotatably engageable over said bushing adapted to be lockingly engaged by said spring lock at a predetermined point of its rotative movement.

2. A cap lock, including an externally screw-threaded bushing, a part of said bushing being struck outwardly therefrom and disposed circumferentially thereof, and an internally screw-threaded cap rotatably engaged over the screw-threaded portion of said bushing and said outwardly struck portion adapted to be engaged by the free and outermost end of said outwardly struck portion at a predetermined point of its rotative movement for preventing further rotation of the same in one direction.

3. A cap lock, including an externally screw-threaded bushing, an internally screw-threaded cap rotatably engageable over the screw-threaded portion of said bushing having a marginally opening way in its side, and a circumferentially disposed radially and outwardly extended lock spring integral with the adjacent screw-threaded portion of the bushing having its free and outermost end engageable in the marginally opening way of said cap at a predetermined point of its rotative movement on the bushing.

4. A cap lock, including an externally screw-threaded bushing having a longitudinal slot formed in a portion of its side, an internally screw-threaded cap rotatably engageable over the screw-threaded portion of said bushing having a marginally opening way in its side, and said bushing having an acutely angular cut disposed circumferentially of its screw-threaded portion opening at one end into its longitudinal slot to form a normally outwardly movable spring lock engageable, at times, in the marginally opening way of said cap to prevent rotation of the same in a predetermined direction.

5. A cap lock, including an externally screw-threaded bushing, a part of said bushing being struck radially outwardly from the side thereof, and an internally screw-threaded cap rotatably engaged over the screw-threaded portion of said bushing adapted to be engaged by said outwardly struck portion at a predetermined point of its rotative movement in one direction for preventing its further rotation in one direction.

6. A cap lock, including a bushing having a longitudinal slot in a portion of its side, a cap rotatably and longitudinally movable over said bushing having an opening in its side, and radially movable spring locking means integral with a portion of the side of said bushing engageable in said opening in the cap at a predetermined point of its rotary and longitudinal movement on the bushing.

7. A cap lock, including a bushing having a longitudinal slot in a portion of its side, a cap rotatably engaged over the screw-threaded portion of said bushing having a marginally opening way in its side, and said bushing having an acutely angular slot formed in and disposed circumferentially thereof opening at one end into its longitudinal slot to form a normally outwardly movable spring lock engageable, at times, in the marginally opening way of said cap to prevent rotation thereof in a predetermined direction.

FRANK BURDICK.